(12) United States Patent
Singh et al.

(10) Patent No.: US 9,710,415 B2
(45) Date of Patent: Jul. 18, 2017

(54) ASYNCHRONOUS FIFO BUFFER WITH JOHNSON CODE WRITE POINTER

(71) Applicants: Chanpreet Singh, SAS Nagar (IN); Kshitij Bajaj, Sirsa (IN); Abhineet Kumar Bhojak, Noida (IN); Anisha Ladsaria, Noida (IN); Tejbal Prasad, Greater Noida (IN)

(72) Inventors: Chanpreet Singh, SAS Nagar (IN); Kshitij Bajaj, Sirsa (IN); Abhineet Kumar Bhojak, Noida (IN); Anisha Ladsaria, Noida (IN); Tejbal Prasad, Greater Noida (IN)

(73) Assignee: NXP USA, INC., Austin, TX (US)

( * ) Notice: Subject to any disclaimer, the term of this patent is extended or adjusted under 35 U.S.C. 154(b) by 401 days.

(21) Appl. No.: 14/531,992

(22) Filed: Nov. 3, 2014

(65) Prior Publication Data

US 2016/0124889 A1    May 5, 2016

(51) Int. Cl.

| G06F 13/26 | (2006.01) |
| G06F 13/42 | (2006.01) |
| G06F 13/16 | (2006.01) |
| G06F 5/06  | (2006.01) |
| G06F 5/14  | (2006.01) |

(52) U.S. Cl.
CPC .......... *G06F 13/4239* (2013.01); *G06F 5/065* (2013.01); *G06F 5/14* (2013.01); *G06F 13/1673* (2013.01); *G06F 2205/067* (2013.01); *G06F 2205/102* (2013.01)

(58) Field of Classification Search
None
See application file for complete search history.

(56) References Cited

U.S. PATENT DOCUMENTS

| 5,363,141 A | 11/1994 | Faryar et al. |
| 5,673,396 A | 9/1997 | Smolansky et al. |
| 6,327,207 B1 * | 12/2001 | Sluiter .................. G06F 5/10 |
| | | 365/189.07 |
| 6,337,893 B1 | 1/2002 | Pontius |
| 6,703,950 B2 | 3/2004 | Yi |
| 7,315,600 B2 | 1/2008 | Sigurdsson et al. |
| 7,457,894 B2 | 11/2008 | Roever |
| 2010/0174877 A1 * | 7/2010 | Yagihashi .............. G06F 5/14 |
| | | 711/155 |

* cited by examiner

*Primary Examiner* — Henry Tsai
*Assistant Examiner* — Dean Phan
(74) *Attorney, Agent, or Firm* — Charles E. Bergere

(57) ABSTRACT

An asynchronous data transfer system includes a bus interface unit (BIU), a FIFO write logic module, a write pointer synchronizer, a write pointer validator, a FIFO read logic module, and an asynchronous FIFO buffer. The FIFO buffer receives a variable size data from the BIU and stores the variable size data at a write address. The FIFO write logic module generates a write pointer by encoding the write address using a Johnson code. The FIFO read logic module receives a synchronized write pointer at the asynchronous clock domain and generates a read address signal when the synchronized write pointer is a valid Johnson code format. The FIFO buffer transfers the variable size data to a processor based on the read address signal.

20 Claims, 8 Drawing Sheets

| WRITE ADDRESS | GRAY CODE FOR WRITE POINTER |
|---|---|
| 1st write address count value | 000 |
| 2nd write address count value | 001 |
| 3rd write address count value | 011 |
| 4th write address count value | 010 |
| 5th write address count value | 110 |
| 6th write address count value | 111 |
| 7th write address count value | 101 |
| 8th write address count value | 100 |

FIFO WRITE LOGIC MODULE

FIG. 2
-PRIOR ART-

| Write address | Modified Johnson Code for write pointer | Equivalent Modified Johnson Code for write pointer |
|---|---|---|
| 1st write address count value | 0000 0001 | 1111 1110 |
| 2nd write address count value | 0000 0011 | 1111 1100 |
| 3rd write address count value | 0000 0111 | 1111 1000 |
| 4th write address count value | 0000 1111 | 1111 0000 |
| 5th write address count value | 0001 1111 | 1110 0000 |
| 6th write address count value | 0011 1111 | 1100 0000 |
| 7th write address count value | 0111 1111 | 1000 0000 |
| 8th write address count value | 1111 1111 | 0000 0000 |

WRITE POINTER ENCODER

FIG. 5

ASYNCHRONOUS FIFO BUFFER WITH JOHNSON CODE WRITE POINTER

BACKGROUND OF THE INVENTION

The present invention generally relates to integrated circuits, and, more particularly, to an integrated circuit with an asynchronous first-in-first-out (FIFO) buffer.

Integrated circuits (ICs) including system-on-chips (SoCs) integrate various digital as well as analog components on a single chip. The ICs communicate with different types of external components including dynamic random access memories (DRAMs), double-data rate (DDR) memories, and Ethernet and universal serial data-bus (USB) devices. For example, a processor of the IC may fetch video data from a DDR memory and display the video data on a display unit coupled to the IC.

Generally, the external components and the IC operate on disparate clock signals, where the IC operates in an asynchronous clock domain with respect to the external components. To facilitate communication between various components, such as the processor and the external components, an asynchronous data transfer system is used. The asynchronous data transfer system includes an asynchronous first-in-first-out (FIFO) buffer and a bus interface unit (BIU). The asynchronous data transfer system is connected to the external components for receiving data from the external components and transferring the received data to the IC via the FIFO buffer.

FIG. 1 is a schematic block diagram of a conventional asynchronous data transfer system 100. The asynchronous data transfer system 100 is used for transferring input data to an asynchronous clock domain. The asynchronous data transfer system 100 is connected to an IC 102 and a DDR memory 104 via a system bus 106.

The IC 102 includes a processor 108 that initiates fetching of the input data from the DDR memory 104. The processor 108 operates based on a read clock (RCLK) signal. To fetch the input data, the processor 108 generates a read increment signal. For example, the processor 108 may fetch the input data from the DDR memory 104 and display the input data on a display unit (not shown) connected to the IC 102.

The asynchronous data transfer system 100 includes a BIU 110, an asynchronous FIFO buffer 112, a FIFO write logic module 114, a write pointer synchronizer 116, a FIFO read logic module 118, and a read pointer synchronizer 120. The BIU 110, the asynchronous FIFO buffer 112, the FIFO write logic module 114, and the read pointer synchronizer 120 operate based on a write clock (WCLK) signal, and hence form a write-clock domain. The FIFO read logic module 118 and the write pointer synchronizer 116 operate based on the read clock (RCLK) signal, and hence, form a read-clock domain.

The BIU 110 is connected to the DDR memory 104 for receiving the input data via the system bus 106. The BIU 110 generates a write increment signal when a fixed amount of the input data is accumulated at the BIU 110, and provides the write increment signal to the FIFO write logic module 114. Subsequently, the BIU 110 provides the input data to the asynchronous FIFO buffer 112.

The FIFO write logic module 114 is connected to the BIU 110 and includes a write counter (not shown) that stores a write address count value indicative of a write address in the asynchronous FIFO buffer 112, which stores the input data. The FIFO write logic module 114 receives the write increment signal and increments the write address count. In one example, if the amount input data accumulated at the BIU 110 is 8 bytes, the write address count is incremented by one. Thus, the incremented write address count refers to a fill level of 8 bytes, i.e., the FIFO buffer 112 is filled with 8 bytes of data. Based on the incremented write address count value, the FIFO write logic module 114 generates and provides a write address signal to the FIFO buffer 112 to initiate storing of the input data. The FIFO buffer 112 receives the input data from the BIU 110 and stores the input data based on the write address signal. After storing the input data at the address of the FIFO buffer 112 indicated by the write address signal, the FIFO write logic module 114 generates a write pointer indicative of the incremented write address count value. The FIFO write logic module 114 provides the write pointer to the write pointer synchronizer 116.

The write pointer synchronizer 116 receives the write pointer and transfers the write pointer from the write-clock domain to the read-clock domain. Thus, the write pointer synchronizer 116 synchronizes the write pointer for the read-clock domain. The write pointer synchronizer 116 may include multiple flip-flops (not shown) that operate using the read clock (RCLK) signal.

The FIFO read logic module 118 is connected to the write pointer synchronizer 116 for receiving the synchronized write pointer. The FIFO read logic module 118 includes a read counter (not shown) that stores a read address count value that is indicative of a read address of the FIFO buffer 112. The read address corresponds to an address of the FIFO buffer 112 that stores the first byte of the input data. The FIFO read logic module 118 is further connected to the processor 108 for receiving the read increment signal and incrementing the read address count. Based on the incremented read address count, the FIFO read logic module 118 generates and provides a read address signal to the FIFO buffer 112 to initiate the transfer of the input data to the processor 108. The FIFO read logic module 118 increments the read address count based on the synchronized write pointer. In one example, if the size of the input data is 8 bytes, the FIFO read logic module 118 increments the read address count by one. The FIFO read logic module 118 further generates a read pointer based on the incremented read address count value. Similarly, the FIFO read logic module 118 transfers the read pointer to the write-clock domain via the read pointer synchronizer 120. The read pointer synchronizer 120 is structurally and functionally similar to the write pointer synchronizer 116.

Thus, the FIFO write logic module 114 uses the write pointer to transfer the input data to the asynchronous clock domain, i.e., the read-clock domain. Conventionally, the FIFO write logic module 114 uses a binary gray code encoder to generate the write pointer based on the write address count value.

FIG. 2 is a schematic block diagram of a conventional binary gray code encoder 202 of the asynchronous data transfer system 100. The FIFO write logic module 114 includes the binary gray code encoder 202. In one example, the binary gray code encoder 202 is a look-up table (LUT) that stores a mapping between multiple write address count values and corresponding write pointers. Each write pointer is an N-bit word that conforms to a binary gray code. Similarly, the FIFO read logic module 118 includes another binary gray code encoder (not shown) for the read address count values. Consecutive binary gray code values differ by 1 bit, and hence, consecutive write pointers also differ by 1 bit. Thus, if a write pointer is transmitted erroneously, the incorrect write pointer will differ by 1 bit. The aforementioned property of the binary gray code allows prevention of a read miss on the FIFO buffer 112 due to erroneously transmitted write pointers, and hence, binary gray codes are used for transmitting read and write pointers across asynchronous clock domains. However, the aforementioned property is true only if the write address count is incremented by a fixed value, i.e., one.

For example, the binary gray code encoder 202 may generate a first data word (000), a second data word (001) and a third data word (011) for first, second and third write address count values, respectively. The write address count value is initially set to the first write address count value. When the BIU 110 accumulates the input data of size 8 bytes, the FIFO write logic module 114 increments the write address count by one, and hence, the incremented write address count value corresponds to the second write address count value. Subsequently, the binary gray code encoder 202 generates the second data word (001) as the write pointer.

If the write pointer synchronizer 116 erroneously transmits the write pointer to the asynchronous clock domain (the read-clock domain), i.e., the least significant bit (LSB) of the second data word fails to toggle, the incorrectly synchronized write pointer either will correspond to either the first data word (000) or the third data word (011). However, since the write address count value is incremented sequentially, the FIFO read logic module 118 determines the incorrectly synchronized write pointer as the first data word (000). Thus, the FIFO read logic module 118 receives a data word corresponding to the previous write address count, and hence, determines that the input data is not stored in the asynchronous FIFO buffer 112. Thus, the FIFO read logic module 118 does not initiate the transfer of the input data to the processor 108.

When the write pointer synchronizer 116 synchronizes the write pointer to the read-clock domain correctly, i.e., the least significant bit (LSB) of the second data word toggles, the synchronized write pointer corresponds to the second data word (001). The FIFO read logic module 118 determines that the input data of 8 bytes is stored in the FIFO buffer 112, and hence, initiates the transfer of the input data to the processor 108. Thus, due to the use of binary gray code, the error in the synchronized write pointer does not lead to a read miss of the FIFO buffer 112 at the read-clock domain.

However, to retain the aforementioned property for preventing a read miss of the FIFO buffer 112, the write address count must be incremented sequentially and by a fixed value for a fixed size of input data. In one example, if the BIU 110 writes input data of size 16 bytes, the FIFO write logic module 114 increments the write address count by 2, and hence, the incremented write address count corresponds to the third write address count value. Subsequently, the binary gray code encoder 202 generates the third data word (011) as the write pointer.

Thus, the incorrectly synchronized write pointer may refer to either the second data word (001) or the fourth data word (010). Since the write address count is always incremented by one, the FIFO read logic module 118 may determine the incorrect synchronized write pointer as the fourth data word (010). As a result, the FIFO read logic module 118 determines a fill level of 24 bytes instead of 16 bytes, and hence, the processor 108 encounters a read miss of the FIFO buffer 112 for the penultimate 8 bytes. Therefore, the processor 108 generates a transmission error, and hence, may halt subsequent processing of the input data. Thus, the write address count is always incremented sequentially at fixed size intervals. Conventionally, the FIFO write logic module 114 increments the write address count every 8 bytes of input data stored in the FIFO buffer 112. To enable writing a fixed size of input data to the FIFO buffer 112, the BIU 110 includes an accumulator (not shown) for accumulating the input data received from the system bus 106 until a fill level of 8 bytes is reached. In one example, the accumulator is a cache memory. When the BIU 110 accumulates 8 bytes of input data, the BIU 110 generates the write increment signal to initiate writing of the input data to the FIFO buffer 112.

FIG. 3 is a timing diagram illustrating the transfer of input data across asynchronous clock domains of the asynchronous data transfer system 100. From T0-T2, the system bus 106 receives and outputs input data of size 2 bytes to the BIU 110. From T1-T3, the BIU 110 receives the input data of size 2 bytes and accumulates 2 bytes of data. From T2-T4, the system bus 106 receives and outputs input data of size 4 bytes to the BIU 110. From T3-T5, the BIU 110 receives the input data of size 4 bytes, and hence, accumulates 6 bytes. From T4-T7, the system bus 106 receives and outputs input data of size 6 bytes to the BIU 110. From T5-T7, the BIU 110 receives the input data of size 6 bytes, and hence, accumulates 12 bytes. Since the fill level of the accumulator, which is 8 bytes, is exceeded, at T7 the BIU 110 generates the write increment signal. Thus, at T7, the FIFO write logic module 114 initiates storing of 8 bytes of the accumulated input data in the FIFO buffer 112.

Due to the constraint of writing a fixed amount (size) of input data to the FIFO buffer 112, the input data received at T0 is written to the FIFO buffer 112 at T7. Thus, a delay is introduced in the asynchronous data transfer system 100. The aforementioned delay sacrifices bandwidth across the FIFO buffer 112, and hence, results in latencies in the operation of the processor 108 and the IC 102. Thus, the asynchronous data transfer system 100, which uses the binary gray code encoder 202, is not suitable for low latency and high bandwidth application-based ICs. Further, ICs that are used for applications such as display, unpack pixel components that are in alpha red blue green (ARGB) and YUV formats by accessing unaligned data from the double-data rate (DDR) memory. Therefore, such application-based ICs require transfer of input data of variable size across the asynchronous clock domains. Thus, the asynchronous data transfer system 100 that uses the binary gray code encoder 202 is not suitable for such application-based ICs.

One known asynchronous data transfer system that overcomes the aforementioned problems and enables transmission of variable size input data across asynchronous clock domains includes a main FIFO buffer for transferring input data of variable size and multiple auxiliary FIFO buffers for transferring read and write pointers, respectively, across asynchronous clock domains. However, this technique requires additional auxiliary FIFO buffers and additional logic modules associated therewith, and hence, results in an increase in the area and complexity of the data transfer circuitry. Thus, there is need for an asynchronous data transfer system that accommodates transmission of input data having variable size across asynchronous clock domains without increasing the area and complexity of the asynchronous data transfer system.

BRIEF DESCRIPTION OF THE DRAWINGS

The following detailed description of the preferred embodiments of the present invention will be better understood when read in conjunction with the appended drawings. The present invention is illustrated by way of example.

FIG. 2 is a schematic block diagram of a conventional binary gray code encoder of the asynchronous data transfer system of FIG. 1;

FIG. 5 is a schematic block diagram of a write pointer encoder of the asynchronous data transfer system of FIG. 4, in accordance with an embodiment of the present invention;

DETAILED DESCRIPTION

Figure 1:
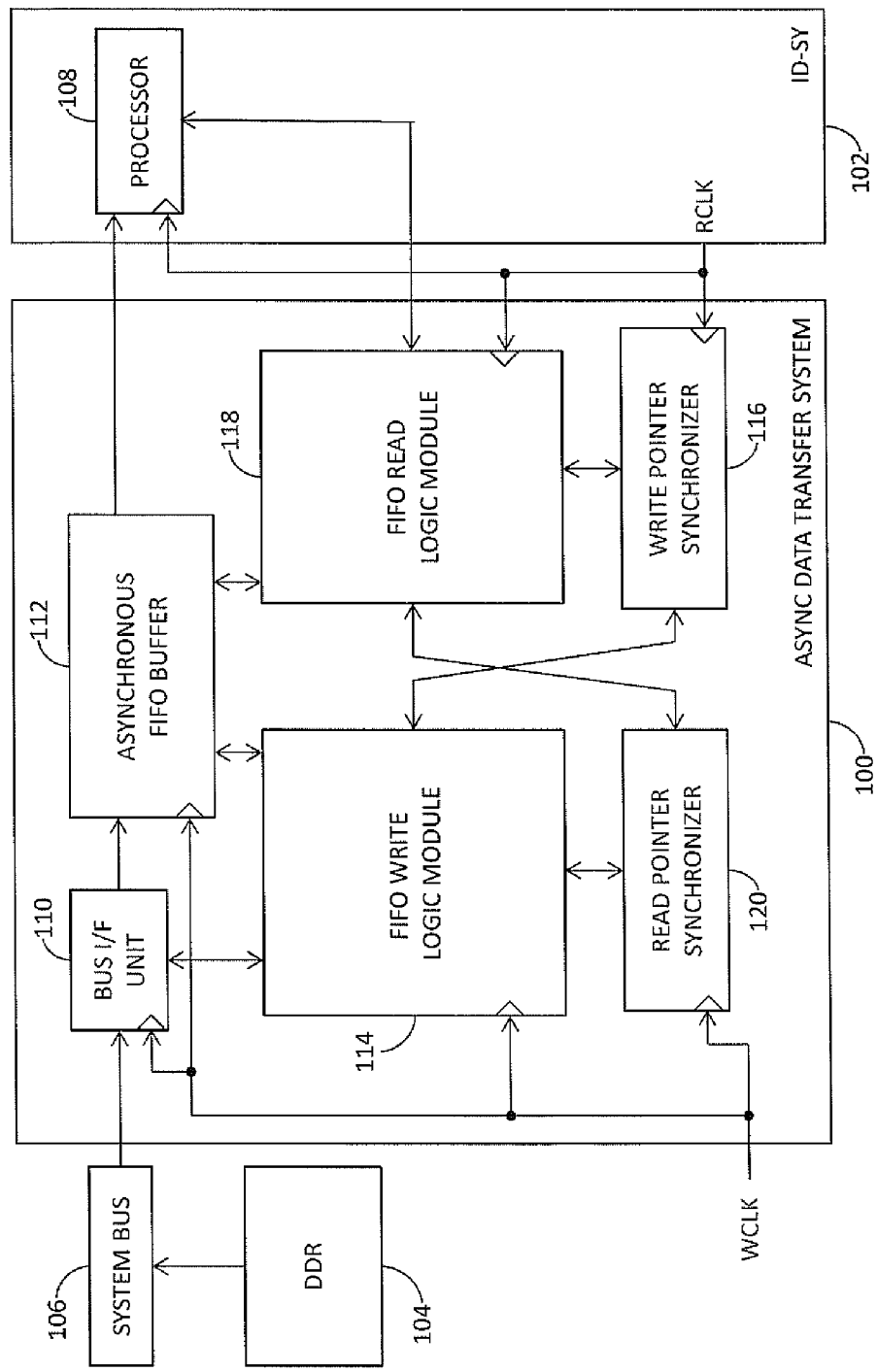
FIG. 1 is a schematic block diagram of a conventional asynchronous data transfer system.
Figure 3:
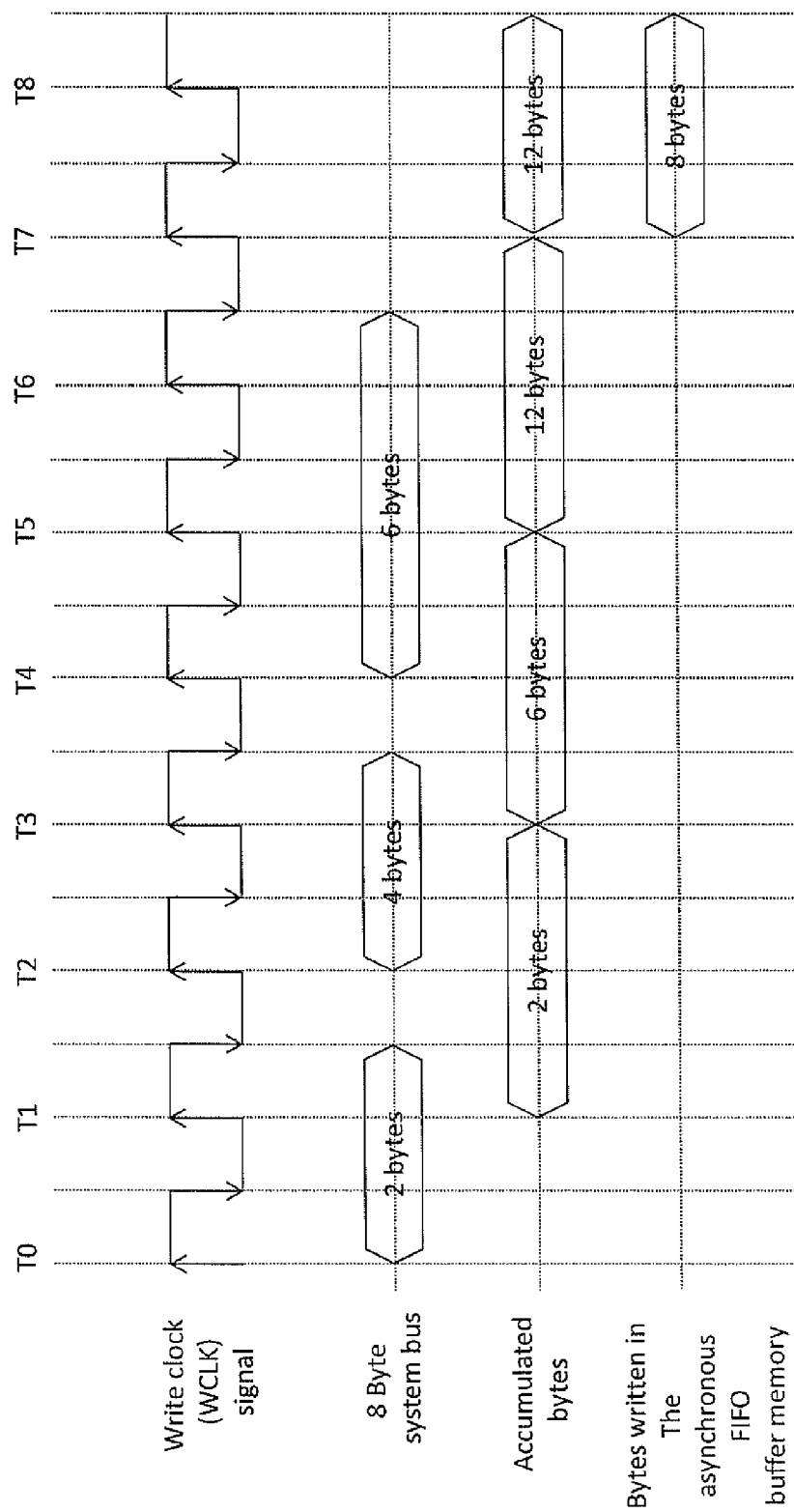
FIG. 3 is a timing diagram illustrating the timing of a transfer operation of input data across asynchronous clock domains of the asynchronous data transfer system of FIG. 1.

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In an embodiment of the present invention, a system for transferring input data to an asynchronous clock domain is provided. The system includes a write address generator, a write pointer encoder, a write pointer synchronizer, a write pointer validator, a write pointer decoder, a read address generator, and an asynchronous FIFO buffer. The write address generator receives a write increment signal and a write clock signal, increments a write address count value, and generates a write address signal. The write pointer encoder receives the write address count value, encodes the write address count value using a Johnson code, and generates a write pointer. The write pointer synchronizer receives a read clock signal and the write pointer, and outputs a synchronized write pointer. The write pointer validator receives the synchronized write pointer, and generates a write pointer valid signal when the synchronized write pointer conforms to a Johnson code format. The write pointer decoder receives the synchronized write pointer and the write pointer valid signal, decodes the synchronized write pointer, and generates a synchronized write address count value. The read address generator receives a read increment signal, the read clock signal, and the synchronized write address count value, increments a read address count value based on the read increment signal and the synchronized write address count value, and generates a read address signal. The asynchronous FIFO buffer receives the write address and the read address signals, stores the input data based on the write address signal, and transfers the input data to the asynchronous clock domain based on the read address signal.

In another embodiment of the present invention, a system for transferring input data to an asynchronous clock domain is provided. The system includes a bus interface unit, a first-in-first-out (FIFO) write logic module, a write pointer synchronizer, a write pointer validator, a FIFO read logic module, and an asynchronous FIFO buffer. The bus interface unit receives the input data and generates a write increment signal based on a length of the input data. The FIFO write logic module receives a write clock signal and the write increment signal, increments a write address count value, encodes the write address count value using a Johnson code, and generates a write pointer and a write address signal. The write pointer synchronizer receives a read clock signal and the write pointer, and outputs a synchronized write pointer. The write pointer validator receives the synchronized write pointer, and generates a write pointer valid signal when the synchronized write pointer conforms to a Johnson code format. The FIFO read logic module receives the read clock signal, a read increment signal, the synchronized write pointer and the write pointer valid signal, decodes the synchronized write pointer, generates a synchronized write address count value, increments a read address count value based on the read increment signal and the synchronized write address count value, and generates a read address signal. The asynchronous FIFO buffer receives the write address and the read address signals, and the input data, stores the input data based on the write address signal, and transfers the input data to the asynchronous clock domain based on the read address signal.

In yet another embodiment of the present invention, a method for transferring input data from a first clock domain to a second clock domain is provided. The method includes incrementing a write address count value based on a write increment signal. A write address signal is generated based on a write address count value. The input data from the first clock domain is received and stored in an asynchronous FIFO buffer based on the write address signal. The write address count value is encoded using a Johnson code and a write pointer is generated at the first clock domain. A synchronized write pointer is generated based on the write pointer. The synchronized write pointer is received at the second clock domain. A write pointer valid signal is generated when the synchronized write pointer conforms to a Johnson code format. The synchronized write pointer is decoded based on the write pointer valid signal and a synchronized write address count value is generated. A read address count value is incremented based on a read increment signal and the synchronized write address count value. Subsequently, a read address signal is generated. The input data is transferred from the asynchronous FIFO buffer to the second clock domain based on the read address signal.

Various embodiments of the present invention provide an asynchronous data transfer system for transferring input data of variable size to an asynchronous clock domain. The asynchronous data transfer system includes a bus interface unit (BIU), a first-in-first-out (FIFO) write logic module, a write pointer synchronizer, a write pointer validator, a FIFO read logic module, and an asynchronous FIFO buffer and is connected between a system bus and a processor. The BIU, the FIFO write logic module, and the asynchronous FIFO buffer operate based on a write clock signal, and hence, constitute a write-clock domain. The write pointer synchronizer, the write pointer validator, the FIFO read logic module, and the processor operate based on a read clock signal, and hence, constitute a read-clock domain.

The bus interface unit receives the input data of variable size from a DDR memory by way of the system bus and generates a write increment signal based on a length of the input data of variable size. The FIFO write logic module receives the write increment signal and generates a write address signal to store the input data in the asynchronous FIFO buffer. The FIFO write logic module further generates a write pointer using a Johnson code and transfers the write pointer as a synchronized write pointer by way of the write pointer synchronizer and validator to the read-clock domain. Since the FIFO write logic module uses the Johnson code to generate the write pointer and the write pointer validator checks whether the synchronized write pointer conforms to the Johnson code format, the fill level indicated by an incorrectly synchronized write pointer is always less than the fill level indicated by the synchronized write pointer by unity, and hence, prevents a read miss on the asynchronous FIFO buffer when the input data of variable size is transferred.

Further, since the asynchronous data transfer system allows transfer of input data of variable size across asynchronous clock domains, the BIU does not accumulate the input data. The FIFO read logic module receives the synchronized write pointer and initiates transfer of the variable size input data to the processor, and hence, from the write-clock domain to the read-clock domain. Further, due to the absence of multiple auxiliary FIFO buffer memories, the asynchronous data transfer system reduces latencies and increases bandwidth across the asynchronous FIFO buffer without increasing area and complexity.

Figure 4:
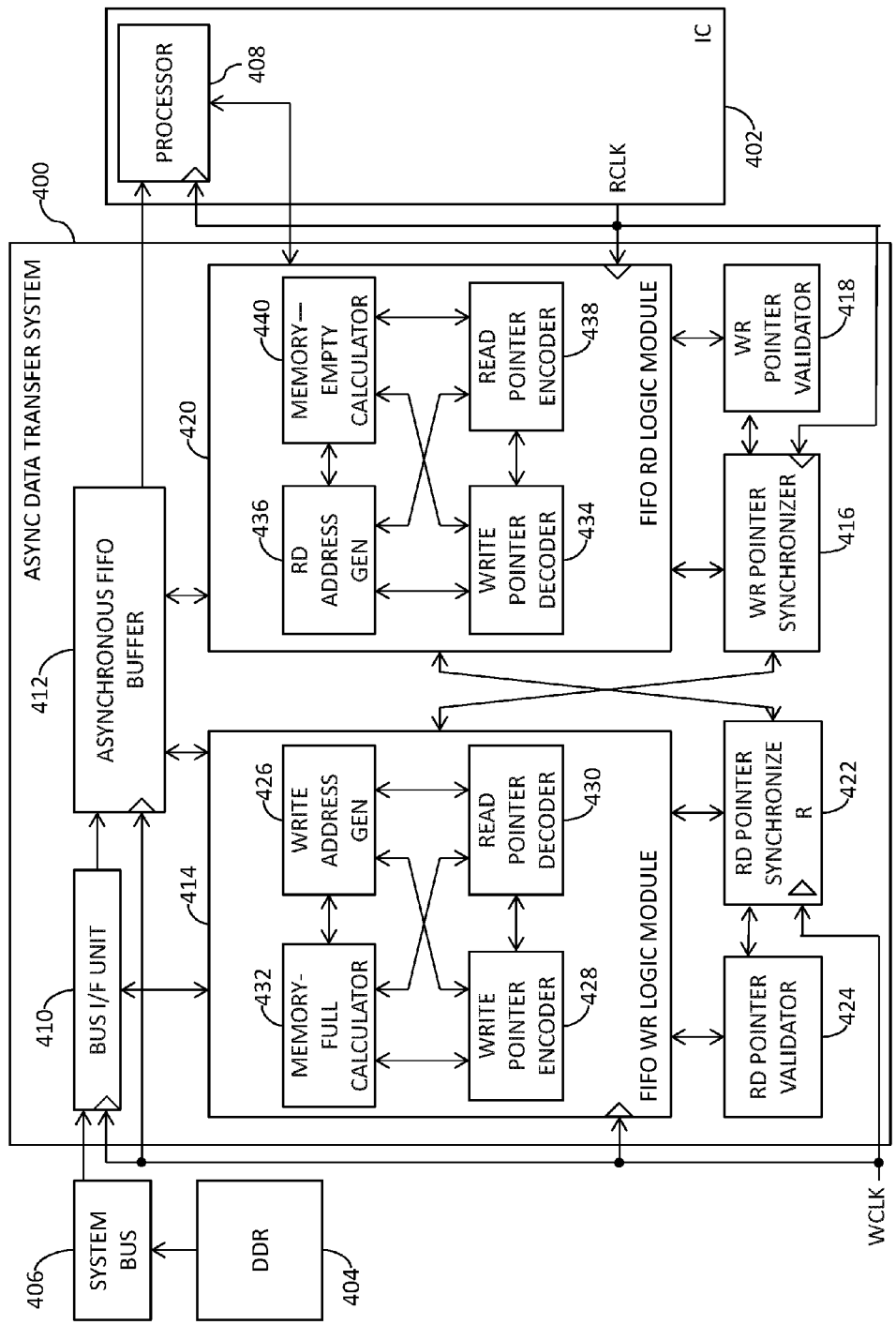
FIG. 4 is a schematic block diagram of an asynchronous data transfer system in accordance with an embodiment of the present invention.

Referring now to FIG. 4, a schematic block diagram of an asynchronous data transfer system 400 in accordance with an embodiment of the present invention is shown. The asynchronous data transfer system 400 is used for transferring input data of variable size from a write-clock domain that includes components that operate based on a write clock (WCLK) signal to a read-clock domain that includes components that operate based on a read clock (RCLK) signal. Since the write-clock and read-clock domains are asynchronous, the asynchronous data transfer system 400 transfers the input data across asynchronous clock domains. The asynchronous data transfer system 400 is connected to an IC 402 and a double-data rate (DDR) memory 404 by way of a system bus 406.

The IC 402 is an application-based IC and includes a processor 408 that initiates fetching of the input data from the DDR memory 404 by way of the system bus 406 and the asynchronous data transfer system 400 for various applications, examples of which include display and multimedia playback. To fetch the input data, the processor 408 generates a read increment signal. In an example, the processor 408 fetches the input data from the DDR memory 404 and displays the input data on a display unit (not shown) connected to the IC 402. Various components of the IC 402 such as the processor 408 and the display unit operate based on the read clock (RCLK) signal, and hence, are included in the read-clock domain.

The DDR memory 404 stores input data required by the application-based ICs such as IC 402. In an example, the input data corresponds to pixel component data stored in alpha red blue green (ARGB) and YUV formats.

The asynchronous data transfer system 400 includes a bus interface unit (BIU) 410, an asynchronous FIFO buffer 412, a FIFO write logic module 414, a write pointer synchronizer 416, a write pointer validator 418, a FIFO read logic module 420, a read pointer synchronizer 422, and a read pointer validator 424. The BIU 410, the asynchronous FIFO buffer 412, the FIFO write logic module 414, the read pointer validator 422, and the read pointer synchronizer 424 operate based on the write clock (WCLK) signal, and hence, are included in the write-clock domain. The write pointer synchronizer 416, the write pointer validator 418, and the FIFO read logic module 420 operate based on the read clock (RCLK) signal, and hence, are included in the read-clock domain.

The FIFO write logic module 414 includes a write address generator 426, a write pointer encoder 428, a read pointer decoder 430, and a memory-full calculator 432. The FIFO read logic module 420 includes a write pointer decoder 434, a read address generator 436, a read pointer encoder 438, and a memory-empty calculator 440.

The BIU 410 is connected to the DDR memory 404 for receiving the input data by way of the system bus 406. The input data is of variable size. In an example, the processor 408 requests for accessing unaligned pixel component data from the DDR memory 404. Therefore, the DDR memory 404 provides input data of variable size to the BIU 410 by way of the system bus 406. The BIU 410 receives the input data of variable size and generates a write increment signal based on the size of the input data. Subsequently, the BIU 410 provides the write increment signal to the FIFO write logic module 414. Further, the BIU 410 provides the input data to the asynchronous FIFO buffer 412.

The write address generator 426 is connected to the BIU 410 and includes a write counter (not shown) that stores a write address count value indicative of a write address in the asynchronous FIFO buffer 412 that can store the input data. The write address generator 426 receives the write increment signal from the BIU 410 and increments the write address count value based on the size of the input data. In an example, if the size of the input data is 2 bytes, the write address count value is incremented by two. The incremented write address count value refers to a fill level of 2 bytes, i.e., 2 bytes of input data can be filled in the asynchronous FIFO buffer 412. Thus, if an address space of the asynchronous FIFO buffer 412 consists of first through eighth addresses, the first and second addresses will store the 2 bytes of input data and the write address count value will be incremented to point to the third address. Based on the incremented write address count value, the write address generator 426 generates and provides a write address signal to the asynchronous FIFO buffer 412 to initiate storing of the input data.

The asynchronous FIFO buffer 412 is a FIFO memory that is used to transfer the input data from the write-clock domain to the read-clock domain. The asynchronous FIFO buffer 412 receives the input data from the BIU 410 and stores the input data based on the write address signal.

The write pointer encoder 428 is connected to the write address generator 426 for receiving the incremented write address count value. The write pointer encoder 428 encodes the write address count value using a Johnson code and generates a write pointer. In an embodiment of the present invention, the write pointer encoder 428 uses a modified Johnson code to generate the write pointer.

The write pointer synchronizer 416 is connected to the write pointer encoder 428 for receiving the write pointer. The write pointer synchronizer 416 receives the write pointer and transfers the write pointer from the write-clock domain to the read-clock domain. Thus, the write pointer synchronizer 416 synchronizes the write pointer in to the read-clock domain. In an embodiment of the present invention, the write pointer synchronizer 416 includes multiple flip-flops (not shown) that operate based on the read clock (RCLK) signal.

The write pointer validator 418 is connected to the write pointer synchronizer 416 for receiving the synchronized write pointer and generating a write pointer valid signal when the synchronized write pointer conforms to a Johnson code format. In an embodiment of the present invention, the write pointer validator 418 checks for conformation of the synchronized write pointer to the Johnson code format by replicating the most significant bit (MSB) of the synchronized write pointer to generate a check code having length equivalent to the length of the synchronized write pointer. The write pointer validator 418 then performs an XOR operation between the synchronized write pointer and the check code to generate a compare code. The write pointer validator 418 then generates a first count value of consecutive leading logic low bits of the compare code and a second count value of consecutive trailing logic high bits of the compare code. Subsequently, the write pointer validator 418 then sums the first and second count values to generate a third count value. The write pointer validator 418 then generates the write pointer valid signal when the third count value is equal to a predetermined threshold.

In an example, if the synchronized write pointer is an incorrect data word (00000101), the write pointer validator 418 generates a check code equivalent to 00000000. The write pointer validator 418 then generates the compare code equivalent to 00000101. The write pointer validator 418 then generates the first count value equivalent to 5 and second count value equivalent to 1. The write pointer validator 418 then generates the third count value as 6. The predetermined threshold is equivalent to at least one of a depth of the asynchronous FIFO buffer 412 and the number of bits used to encode the write pointer. In this example, the depth of the asynchronous FIFO buffer 412 is equivalent to 8 and refers to the maximum number of bytes that can be stored in the asynchronous FIFO buffer 412. Since the third count value is not equivalent to the predetermined threshold, the write pointer validator 418 identifies that the synchronized write pointer does not conform to the Johnson code format.

In another example, if the synchronized write pointer is a correct data word (00000111), the write pointer validator 418 generates a check code equivalent to 00000000. The write pointer validator 418 then generates the compare code equivalent to 00000111. The write pointer validator 418 then generates the first count value equivalent to 5 and second count value equivalent to 3. The write pointer validator 418 then generates the third count value as 8. Since the third count value is equivalent to the predetermined threshold, the write pointer validator 418 identifies that the synchronized write pointer conforms to the Johnson code format, and hence, generates the write pointer valid signal.

The write pointer decoder 434 is connected to the write pointer synchronizer 416 and the write pointer validator 418 for receiving the synchronized write pointer and the write pointer valid signal, respectively. The write pointer decoder 434 decodes the synchronized write pointer based on the write pointer valid signal and generates a synchronized write address count value. Thus, if the write pointer validator 418 identifies that the synchronized write pointer conforms to the Johnson code format, the write pointer decoder 434 decodes the synchronized write pointer to generate the synchronized write address count value. In the example, if two bytes of input data are stored in the asynchronous FIFO buffer 412, the synchronized write address count value generated from the correctly synchronized write pointer points to third address of the asynchronous FIFO buffer 412.

The read address generator 436 is connected to the processor 408 for receiving the read increment signal and connected to the write pointer decoder 434 for receiving the synchronized write address count value. The read address generator 436 includes a read counter (not shown) that stores a read address count value indicative of a read address of the asynchronous FIFO buffer 412 that stores the input data. The read address count value is initially set to point to the first address of the asynchronous FIFO buffer 412, and hence, points to the first data byte of the stored input data. The read address generator 436 receives the read increment signal and increments the read address count value based on the synchronized write address count value. Based on the incremented read address count value, the read address generator 436 generates and provides a read address signal to the asynchronous FIFO buffer 412 to initiate transfer of the input data to the processor 408. The asynchronous FIFO buffer 412 receives the read address signal and transfers the input data to the processor 408.

In the example, since the size of the input data is 2 bytes, the synchronized write address count value points to the third address of the asynchronous FIFO buffer 412. Thus, the read address generator 436 can increment the read address count value till the synchronized write address count value. The processor 408 generates the read increment signal corresponding to the number of bytes to be fetched from the asynchronous FIFO buffer 412. If the read increment signal corresponds to 2 bytes, then the read address generator 436 increments the read address count value till the third address. The read address generator 436 provides the read address signal corresponding to 2 bytes to the asynchronous FIFO buffer 412. The asynchronous FIFO buffer 412 receives the read address signal and transfers input data of size 2 bytes to the processor 408. Similarly, the asynchronous FIFO buffer 412 transfers the input data of any size from the write-clock domain to the read-clock domain.

The read pointer encoder 438 is connected to the read address generator 436 for receiving the incremented read address count value. The read pointer encoder 438 encodes the incremented read address count value using the Johnson code and generates a read pointer. In an embodiment of the present invention, the read pointer encoder 438 uses a modified Johnson code similar to the write pointer encoder 428 to generate the read pointer.

The memory-empty calculator 440 is connected to the write pointer decoder 434 for receiving the synchronized write pointer and the read pointer encoder 438 for receiving the read pointer. The memory-empty calculator 440 generates a buffer empty signal when the synchronized write pointer equals the read pointer and when the synchronized write pointer and the read pointer conform to the Johnson code format. The buffer empty signal indicates that the asynchronous FIFO buffer 412 is empty. In an embodiment of the present invention, the memory-empty calculator 440 provides the buffer empty signal to the processor 408, whereby the processor 408 ceases fetching of the input data from the asynchronous FIFO buffer 412 by ceasing the generation of the read increment signal.

The read pointer synchronizer 422 is connected to the read pointer encoder 438 for receiving the read pointer. The read pointer synchronizer 422 receives the read pointer and transfers the read pointer from the read-clock domain to the write-clock domain. Thus, the read pointer synchronizer 422 synchronizes the read pointer in to the write-clock domain. In an embodiment of the present invention, the read pointer synchronizer 422 includes multiple flip-flops (not shown) that operate based on the write clock (WCLK) signal.

The read pointer validator 424 is connected to the read pointer synchronizer 422 for receiving the synchronized read pointer and generating a read pointer valid signal when the synchronized read pointer conforms to a Johnson code format. The read pointer validator 424 is structurally and functionally similar to the write pointer validator 418.

The read pointer decoder 430 is connected to the read pointer synchronizer 422 and the read pointer validator 418 for receiving the synchronized write pointer and the read pointer valid signal, respectively. The read pointer decoder 430 decodes the synchronized read pointer based on the read pointer valid signal and generates a synchronized read address count value. In an embodiment of the present invention, the read pointer decoder 430 further provides the synchronized read address count value to the write address generator 426. The write address generator 426 increments the write address count value based on the synchronized read address count value. The read pointer decoder 430 is structurally and functionally similar to the write pointer decoder 434.

The memory-full calculator 432 is connected to the read pointer decoder 430 for receiving the synchronized read pointer and the write pointer encoder 428 for receiving the write pointer. The memory-full calculator 432 generates an inverted synchronized read pointer based on the synchronized read pointer. Subsequently, the memory-full calculator 432 generates a buffer full signal when the inverted synchronized read pointer equals the write pointer and when the synchronized read pointer and the write pointer conform to the Johnson code format. The buffer full signal indicates that the asynchronous FIFO buffer 412 is full. In an embodiment of the present invention, the memory-full calculator 432 provides the buffer full signal to the BIU 410, whereby the BIU 410 ceases fetching of the input data from the DDR memory 404 by way of the system bus 406.

Referring now to FIG. 5, a schematic block diagram of the write pointer encoder 428 of the asynchronous data transfer system 400 in accordance with an embodiment of the present invention is shown. The write pointer encoder 428 includes a Johnson code encoder 502. In an example, the Johnson code encoder 502 is a look-up table (LUT) that stores a mapping between multiple write address count values and corresponding write pointers. Each write pointer is an N-bit word that conforms to a Johnson code. The length of the Johnson code used to generate the write pointers is determined based on a maximum fill level of the asynchronous FIFO buffer 412. Generally, an N-bit Johnson code comprises 2*N data words. However, the Johnson code encoder 502 utilizes only N data words. Therefore, the Johnson code encoder 502 is also referred to as a modified Johnson code encoder 502.

Each write pointer conforms to a Johnson code format and includes two types of representations—modified Johnson code and equivalent modified Johnson code. In an example, a first data word corresponding to a first write address count value is represented as 00000001 in the modified Johnson code representation and as 11111110 in the equivalent modified Johnson code representation. Similarly, the read pointer encoder 438 includes another modified Johnson code encoder (not shown) for the read address count values.

Consecutive Johnson code values differ by 1 bit, and hence, consecutive write pointers also differ by 1 bit. Thus, if the write pointer is transmitted erroneously, the incorrect write pointer will differ by 1 bit. Based on the fill level or the size of the input data, the write and read pointer encoders 428 and 438 receive sequentially incremented write and read address count values and hence, sequentially increment the write and read pointers, respectively. The aforementioned property of the Johnson code allows prevention of a read miss on the asynchronous FIFO buffer 412 due to erroneously transmitted write pointers and when the input data of variable size is transferred. Therefore, Johnson codes are used to transfer the write and read pointers across asynchronous clock domains, i.e., from the write-clock domain to the read-clock domain and vice versa.

In an example, the modified Johnson code encoder 502 generates the first data word (00000001), a second data word (00000011), a third data word (00000111), and a fourth data word (00001111) for first, second, third and fourth write address count values, respectively. If the write address count value is initially set to the first write address count value, and the size of the input data is 2 bytes, the write address generator 426 increments the write address count value by 2, and hence, the incremented write address count value corresponds to the third write address count value. Subsequently, the modified Johnson code encoder 502 receives the incremented write address value corresponding to the third write address count value and generates the third data word (00000111) as the write pointer.

If write pointer synchronizer 416 erroneously transmits the write pointer to the asynchronous clock domain (the read-clock domain), i.e., at least one of the bits of the third data word (00000111) fail to toggle, the incorrectly synchronized write pointer may correspond to at least one of the first data word (00000001), the second data word (00000011), the fourth data word (00001111), the first incorrect data word (00000101), and a second incorrect data word (00000100). The write pointer validator 418 identifies that the first incorrect data word (00000101) and the second incorrect data word (00000100) do not conform to the Johnson code format and hence, the incorrectly synchronized write pointer may correspond to the first data word (00000001), the second data word (00000011), and the fourth data word (00001111).

However, since the write address count value is sequentially incremented, the FIFO read logic module 420 identifies the first data word (00000001) and the second data word (00000011) as correctly synchronized write pointers. The first data word (00000001) and the second data word (00000011) are incorrectly synchronized write pointers refer to a fill level less than the correct fill level of 2 bytes. However, the processor 408 can issue a read request by generating the read increment signal without leading to a read miss on the asynchronous FIFO buffer 412. Therefore, if the FIFO read logic module 420 identifies the second data word (00000011) as a correctly synchronized write pointer, the FIFO read logic module 420 initiates transfer of input data of at least 1 byte to the processor 408.

Similarly, when the write pointer synchronizer 416 synchronizes the write pointer in to the read-clock domain correctly, i.e., the synchronized write pointer corresponds to the third data word (00000111), the FIFO read logic module 420 initiates transfer of the input data of 2 bytes to the processor 408. Thus, due to the usage of the modified Johnson code encoder 502, the error in the synchronized write pointer does not lead to a read miss on the asynchronous FIFO buffer 412 at the read-clock domain.

Since the asynchronous data transfer system 400 uses the modified Johnson code for encoding the write and read pointers and includes write and read pointer validators 418 and 424 that identify whether the synchronized write and read pointers conform to the Johnson code format, the processor 408 does not encounter a read miss on the asynchronous FIFO buffer 412 when the asynchronous data transfer system 400 transfers input data of variable size from the write-clock domain to the read-clock domain. Further, the BIU 410 does not accumulate the input data. Due to the absence of multiple auxiliary FIFO buffer memories, the asynchronous data transfer system 400 reduces latencies and increases bandwidth across the asynchronous FIFO buffer 412 without increasing area and complexity.

Figure 6:
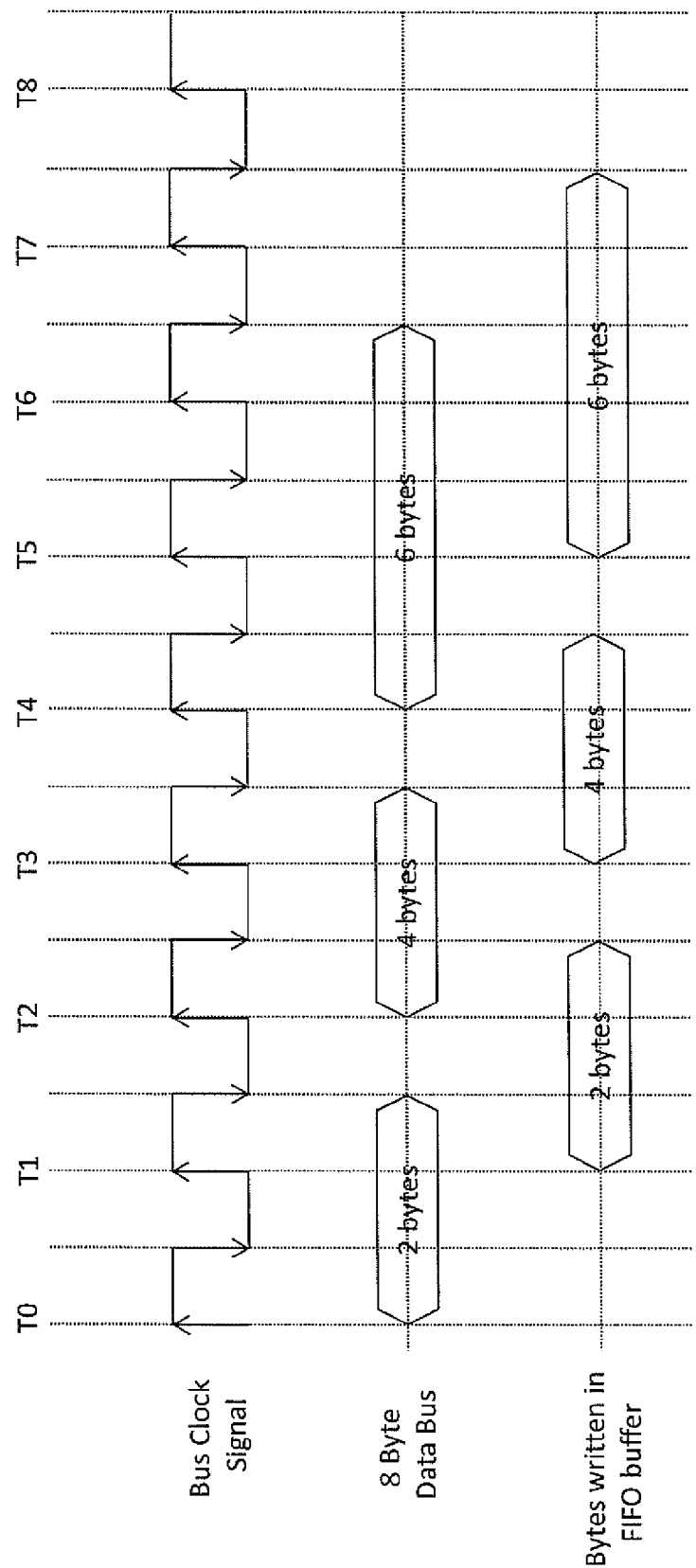
FIG. 6 is a timing diagram illustrating an input date transfer operation across asynchronous clock domains of the asynchronous data transfer system of FIG. 4, in accordance with an embodiment of the present invention.

Referring now to FIG. 6, a timing diagram illustrating transfer operation of the input data across asynchronous clock domains of the asynchronous data transfer system 400 in accordance with an embodiment of the present invention is shown. During time period T0-T2, the system bus 406 receives and outputs input data of size 2 bytes to the BIU 410. During time period T1-T3, the BIU 410 receives the input data of size 2 bytes and generates the write increment signal to indicate the size of the input data. The FIFO write logic module 414 receives the write increment signal and provides the write address signal to the asynchronous FIFO buffer 412. The asynchronous FIFO buffer 412 stores the input data of size 2 bytes. Subsequently, the FIFO write logic module 414 generates and provides the write pointer to the FIFO read logic module 420 in the read-clock domain. The FIFO read logic module 420 receives the read increment signal from the processor 408 and generates the read address signal. The asynchronous FIFO buffer 412 receives the read address signal and transfers the input data of size 2 bytes to the processor 408. Thus, during time period T1-T3, the asynchronous data transfer system 400 transfers the input data without any delay, and hence, reduces latencies and increases bandwidth across the asynchronous FIFO buffer 412 without increasing area and complexity.

Similarly, during time period T2-T4, the system bus 406 receives and outputs input data of size 4 bytes to the BIU 410. During time period T3-T5, the asynchronous data transfer system 400 transfers the input data of size 4 bytes from the write-clock domain to the read-clock domain. During time period T4-T7, the system bus 406 receives and outputs input data of size 6 bytes to the BIU 410. During time period T5-T8, the asynchronous data transfer system 400 transfers the input data of size 6 bytes from the write-clock domain to the read-clock domain.

Figure 7:
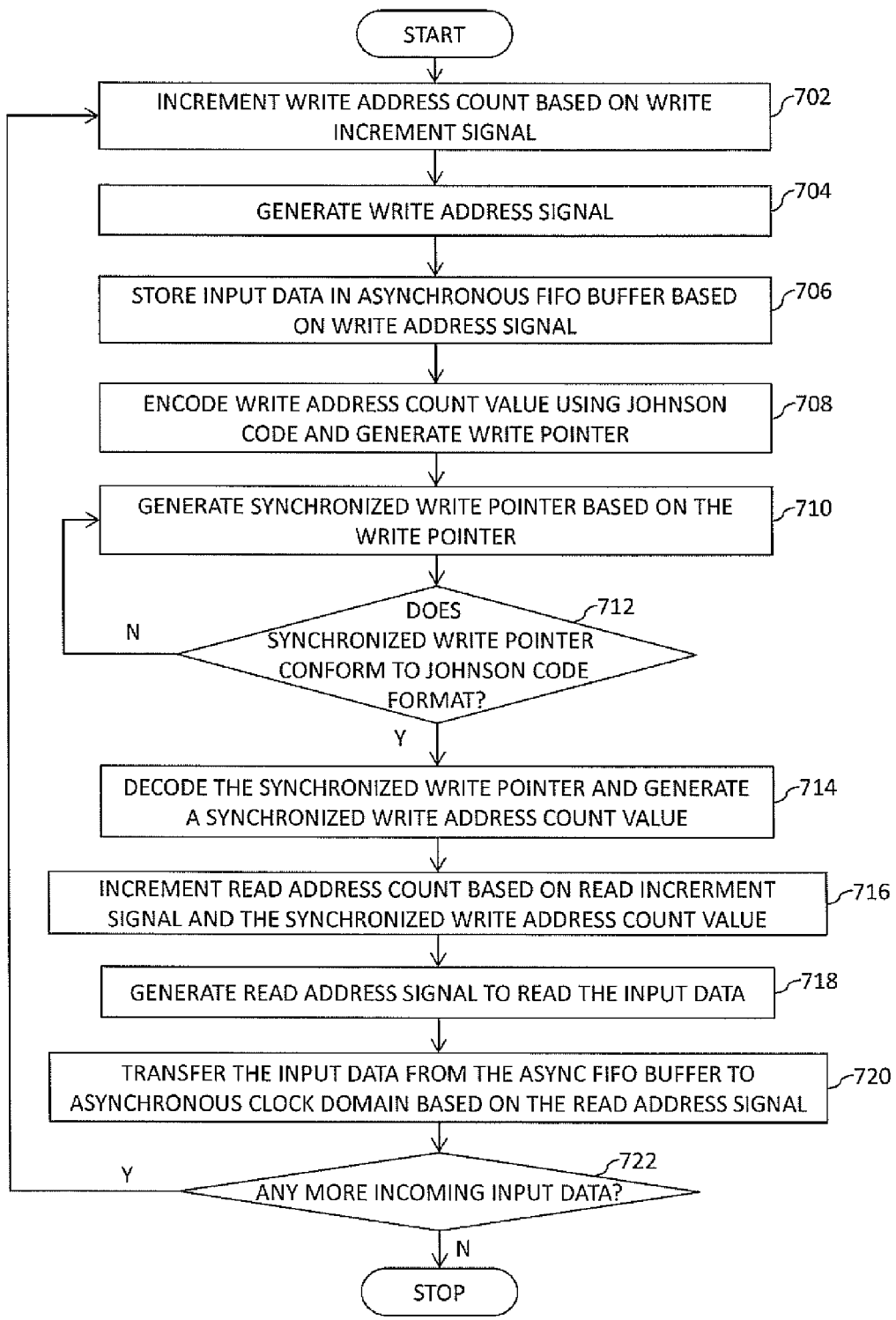
FIG. 7 is a flow chart illustrating a method for transferring input data across asynchronous clock domains in accordance with an embodiment of the present invention.

Referring now to FIG. 7, a flowchart illustrating a method for transferring input data across asynchronous clock domains in accordance with an embodiment of the present invention is shown. At step 702, the write address generator 426 increments the write address count value based on a write increment signal received from the BIU 410. At step 704, the write address generator 426 generates the write address signal. At step 706, the asynchronous FIFO buffer 412 stores the input data of variable size based on the write address signal. At step 708, the write pointer encoder 428 encodes the write address count value using a Johnson code and generates the write pointer. At step 710, the write pointer synchronizer 416 generates the synchronized write pointer based on the write pointer. At step 712, the write pointer validator 418 checks to determine whether the synchronized write pointer conforms to the Johnson code format. If at step 712, the write pointer validator 418 determines that the synchronized write pointer conforms to the Johnson code format, step 714 is executed. At step 714, the write pointer decoder 434 decodes the synchronized write pointer and generates the synchronized write address count value. At step 716, the read address generator 436 increments the read address count value based on the read increment signal received from the processor 408 and the synchronized write address count value. At step 718, the read address generator 436 generates the read address signal to initiate reading of the input data. At step 720, the asynchronous FIFO buffer 412 receives the read address signal and transfers the input data from the write-clock domain to the read-clock domain. At step 722, the BIU 410 checks for incoming input data on the system bus 406.

If at step 712, the write pointer validator 418 determines that the synchronized write pointer does not conform to the Johnson code format, step 710 is executed. If at step 722, the BIU 410 identifies incoming input data on the system bus 406, step 702 is executed.

Figure 8:
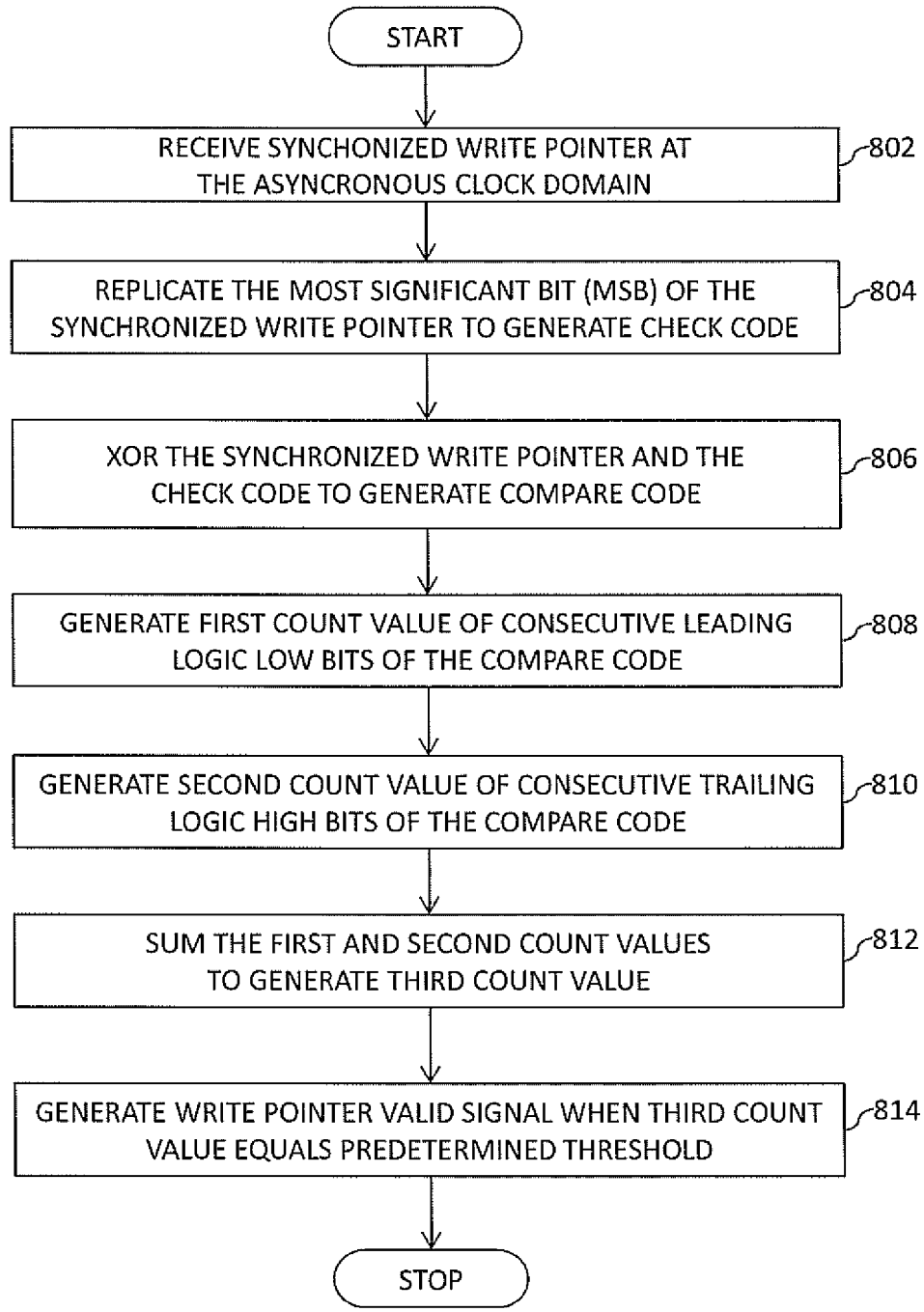
FIG. 8 is a flow chart illustrating a method for validating a write pointer in accordance with an embodiment of the present invention.

Referring now to FIG. 8, a flowchart illustrating a method for validating a write pointer in accordance with an embodiment of the present invention is shown. At step 802, the write pointer validator 418 receives the synchronized write pointer at the read-clock domain. At step 804, the write pointer validator 418 replicates the most significant bit (MSB) of the synchronized write pointer to generate the check code. At step 806, the write pointer validator 418 performs an XOR operation between the synchronized write pointer and the check code to generate the compare code. At step 808, the write pointer validator 418 generates the first count value of consecutive leading logic low bits of the compare code. At step 810, the write pointer validator 418 generates a second count value of consecutive trailing logic high bits of the compare code. At step 812, the write pointer validator 418 sums the first and second count values to generate the third count value. At step 814, the write pointer validator 418 generates the write pointer valid signal when the third count value is equal to the predetermined threshold.

In an embodiment of the present invention, the FIFO write logic module 414, the write pointer validator 418, the FIFO read logic module 420, and the read pointer validator 424 comprise microcontrollers. In another embodiment of the present invention, the FIFO write logic module 414, the write pointer validator 418, the FIFO read logic module 420, and the read pointer validator 424 are implemented on a single microcontroller.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. A system for transferring input data to an asynchronous clock domain, the system comprising:
   a write address generator for receiving a write increment signal and a write clock signal, incrementing a write address count value, and generating a write address signal;
   a write pointer encoder, connected to the write address generator, for receiving the write address count value, encoding the write address count value using a Johnson code, and generating a write pointer;
   a write pointer synchronizer, connected to the write pointer encoder, for receiving a read clock signal and the write pointer, and outputting a synchronized write pointer;
   a write pointer validator, connected to the write pointer synchronizer, for receiving the synchronized write pointer and generating a write pointer valid signal when the synchronized write pointer conforms to a Johnson code format;
   a write pointer decoder, connected to the write pointer synchronizer and the write pointer validator, for receiving the synchronized write pointer and the write pointer valid signal, respectively, decoding the synchronized write pointer, and generating a synchronized write address count value;

a read address generator, connected to the write pointer decoder, for receiving a read increment signal, the read clock signal, and the synchronized write address count value, incrementing a read address count value based on the read increment signal and the synchronized write address count value, and generating a read address signal; and an asynchronous first-in-first-out (FIFO) buffer, connected to the read and write address generators, for receiving the read and write address signals, respectively, storing the input data based on the write address signal, and transferring the input data to the asynchronous clock domain based on the read address signal.

2. The system of claim 1, wherein the write pointer validator:

replicates the most significant bit (MSB) of the synchronized write pointer to generate a check code having a length equal to a length of the synchronized write pointer, performs an XOR operation of the synchronized write pointer and the check code to generate a compare code, generates a first count value of consecutive leading logic low bits of the compare code and a second count value of consecutive trailing logic high bits of the compare code, sums the first and second count values to generate a third count value, and generates the write pointer valid signal when the third count value is equal to a predetermined threshold.

3. The system of claim 1, further comprising:

a bus interface unit, connected to a data bus for receiving the input data, and connected to the write address generator and the asynchronous FIFO buffer, for generating the write increment signal based on a length of the input data to be stored in the asynchronous FIFO buffer, and providing the input data to the asynchronous FIFO buffer and the write increment signal to the write address generator; and a processor, connected to the asynchronous FIFO buffer and the read address generator, for generating the read increment signal based on a length of the input data to be read from the asynchronous FIFO buffer, providing the read increment signal to the read address generator, and receiving the input data from the asynchronous FIFO buffer based on the read increment signal.

4. The system of claim 1, further comprising a read pointer encoder, connected to the read address generator, for receiving the read address count value, encoding the read address count value using the Johnson code, and generating a read pointer.

5. The system of claim 1, further comprising:

a memory-empty calculator, connected to the write pointer decoder and the read pointer encoder, for receiving the synchronized write pointer and the read pointer, respectively, and generating a buffer empty signal when the synchronized write pointer equals the read pointer and when the synchronized write pointer and the read pointer conform to the Johnson code format, thereby indicating that the asynchronous FIFO buffer is empty.

6. The system of claim 5, further comprising:

a read pointer synchronizer connected to the read pointer encoder, for receiving the write clock signal and the read pointer and outputting a synchronized read pointer; and a read pointer validator, connected to the read pointer synchronizer, for receiving the synchronized read pointer, and generating a read pointer valid signal when the synchronized read pointer conforms to the Johnson code format.

7. The system of claim 6, further comprising:

a read pointer decoder, connected to the read pointer synchronizer, for receiving the synchronized read pointer, connected to the read pointer validator for receiving the read pointer valid signal, and connected to the write address generator, for decoding the synchronized read pointer based on the read pointer valid signal, and providing a synchronized read address count value to the write address generator.

8. The system of claim 7, wherein the write address generator further increments the write address count value based on the synchronized read address count value.

9. The system of claim 8, further comprising a memory-full calculator, connected to the read pointer decoder and the write pointer encoder, for receiving the synchronized read pointer and the write pointer, respectively, generating an inverted synchronized read pointer, and generating a buffer full signal when the inverted synchronized read pointer equals the write pointer and when the synchronized read pointer and the write pointer conform to the Johnson code format, thereby indicating that the asynchronous FIFO buffer is full.

10. A system for transferring input data to an asynchronous clock domain, the system comprising:

a bus interface unit connected to a data bus for receiving the input data, and generating a write increment signal based on a length of the input data;

a first-in-first-out (FIFO) write logic module, connected to the bus interface unit, for receiving a write clock signal and the write increment signal, incrementing a write address count value, encoding the write address count value using a Johnson code, and generating a write pointer and a write address signal;

a write pointer synchronizer, connected to the FIFO write logic module, for receiving a read clock signal and the write pointer and outputting a synchronized write pointer;

a write pointer validator, connected to the write pointer synchronizer, for receiving the synchronized write pointer, and generating a write pointer valid signal when the synchronized write pointer conforms to a Johnson code format;

a FIFO read logic module for receiving the read clock signal and a read increment signal, and connected to the write pointer synchronizer and the write pointer validator for receiving the synchronized write pointer and the write pointer valid signal, respectively, decoding the synchronized write pointer, generating a synchronized write address count value, incrementing a read address count value based on the read increment signal and the synchronized write address count value, and generating a read address signal; and an asynchronous first-in-first-out (FIFO) buffer connected to the FIFO write and FIFO read logic modules for receiving the write address and the read address signals, respectively, and to the bus interface unit for receiving the input data, for storing the input data based on the write address signal, and transferring the input data to the asynchronous clock domain based on the read address signal.

11. The system of claim 10, wherein the write pointer validator further:
replicates the most significant bit (MSB) of the synchronized write pointer to generate a check code having a length equal to the length of the synchronized write pointer,
performs an XOR operation on the synchronized write pointer and the check code to generate a compare code, generates a first count value of consecutive leading logic low bits of the compare code and a second count value of consecutive trailing logic high bits of the compare code,
sums the first and second count values to generate a third count value, and
generates the write pointer valid signal when the third count value is equal to a predetermined threshold.

12. The system of claim 10, further comprising a processor connected to the asynchronous FIFO buffer and the FIFO read logic module for generating the read increment signal based on a length of the input data to be read from the asynchronous FIFO buffer, providing the read increment signal to the FIFO read logic module, and receiving the input data from the asynchronous FIFO buffer based on the read increment signal.

13. The system of claim 10, wherein the FIFO read logic module further encodes the read address count value using the Johnson code, and generates a read pointer.

14. The system of claim 13, wherein the FIFO read logic module further generates a buffer empty signal when the synchronized write pointer equals the read pointer and when the synchronized write pointer and the read pointer conform to the Johnson code format, thereby indicating that the asynchronous FIFO buffer is empty.

15. The system of claim 14, further comprising:
a read pointer synchronizer for receiving the write clock signal and connected to the FIFO read logic module for receiving the read pointer, and outputting a synchronized read pointer; and
a read pointer validator connected to the read pointer synchronizer, for receiving the synchronized read pointer, and generating a read pointer valid signal when the synchronized read pointer conforms to the Johnson code format.

16. The system of claim 15, wherein the FIFO write logic module further decodes the synchronized read pointer based on the read pointer valid signal, generates a synchronized read address count value, and increments the write address count value based on the synchronized read address count value.

17. The system of claim 16, wherein the FIFO write logic module further generates a buffer full signal when an inverted synchronized read pointer equals the write pointer and when the synchronized read pointer and the write pointer conform to the Johnson code format, thereby indicating that the asynchronous FIFO buffer is full.

18. A method for transferring input data from a first clock domain to a second clock domain, the method comprising:

incrementing a write address count value based on a write increment signal;
generating a write address signal based on a write address count value;
receiving the input data from the first clock domain and storing the input data in an asynchronous first-in-first-out (FIFO) buffer based on the write address signal;
encoding the write address count value using a Johnson code and generating a write pointer at the first clock domain;
generating a synchronized write pointer based on the write pointer;
receiving the synchronized write pointer at the second clock domain;
generating a write pointer valid signal when the synchronized write pointer conforms to a Johnson code format;
decoding the synchronized write pointer based on the write pointer valid signal and generating a synchronized write address count value;
incrementing a read address count value based on a read increment signal and the synchronized write address count value;
generating a read address signal; and
transferring the input data from the asynchronous FIFO buffer to the second clock domain based on the read address signal.

19. The method of claim 18, wherein generating the write pointer valid signal further comprises:
generating a check code having length equal to the length of the synchronized write pointer by replicating the most significant bit (MSB) of the synchronized write pointer;
performing an XOR operation on the synchronized write pointer and the check code to generate a compare code;
generating a first count value of consecutive leading logic low bits of the compare code and a second count value of consecutive trailing logic high bits of the compare code;
generating a third count value by summing the first and second count values; and
generating the write pointer valid signal when the third count value is equal to a predetermined threshold.

20. The method of claim 18, further comprising:
encoding the read address count value using the Johnson code and generating a read pointer at the second clock domain;
generating a synchronized read pointer based on the read pointer;
receiving the synchronized read pointer at the first clock domain;
generating a read pointer valid signal when the synchronized read pointer conforms to the Johnson code format;
decoding the synchronized read pointer based on the read pointer valid signal and generating a synchronized read address count value; and
incrementing the write address count value based on the synchronized read address count value.

* * * * *